United States Patent

Nakagawa et al.

Patent Number: 5,534,189
Date of Patent: Jul. 9, 1996

[54] LIQUID CRYSTAL COMPOSITION

[75] Inventors: Etsuo Nakagawa; Shinichi Sawada, both of Chibaken, Japan

[73] Assignee: Chisso Corporation, Osaka, Japan

[21] Appl. No.: 493,156

[22] Filed: Jun. 21, 1995

[30] Foreign Application Priority Data

Jun. 23, 1994 [JP] Japan .................................. 6-164513

[51] Int. Cl.$^6$ ........................... C09K 19/30; C09K 19/52; G02F 1/13
[52] U.S. Cl. ............................... 252/299.63; 252/299.01; 359/103
[58] Field of Search .......................... 252/299.01, 299.63; 359/103

[56] References Cited

U.S. PATENT DOCUMENTS

| | | | |
|---|---|---|---|
| 4,400,293 | 8/1983 | Römer et al. ....................... | 252/299.63 |
| 4,778,620 | 10/1988 | Goto et al. ......................... | 252/299.63 |
| 5,344,587 | 9/1994 | Coates et al. ...................... | 252/299.66 |
| 5,358,662 | 10/1994 | Hirose et al. ...................... | 252/299.63 |
| 5,419,851 | 5/1995 | Yokokoji et al. .................. | 252/299.63 |

FOREIGN PATENT DOCUMENTS

| | | |
|---|---|---|
| 0416117 | 3/1991 | European Pat. Off. . |
| 0560382 | 9/1993 | European Pat. Off. . |
| 0571916 | 12/1993 | European Pat. Off. . |

OTHER PUBLICATIONS

DATABASE WPI Week 9315, Derwent Publications Ltd., London, GB; AN 93–121299 & JP–A–05 058 927 (CHISSO CORP), Mar. 9, 1993.

*Primary Examiner*—Shean C. Wu
*Attorney, Agent, or Firm*—Wenderoth, Lind & Ponack

[57] ABSTRACT

Provided is a liquid crystal composition for active matrix addressed display mode which comprises: a first component consisting of at least one compound expressed by formula (I) and a second component consisting of at least one compound selected from the group consisting of compounds expressed by formula (II), (III) or (IV):

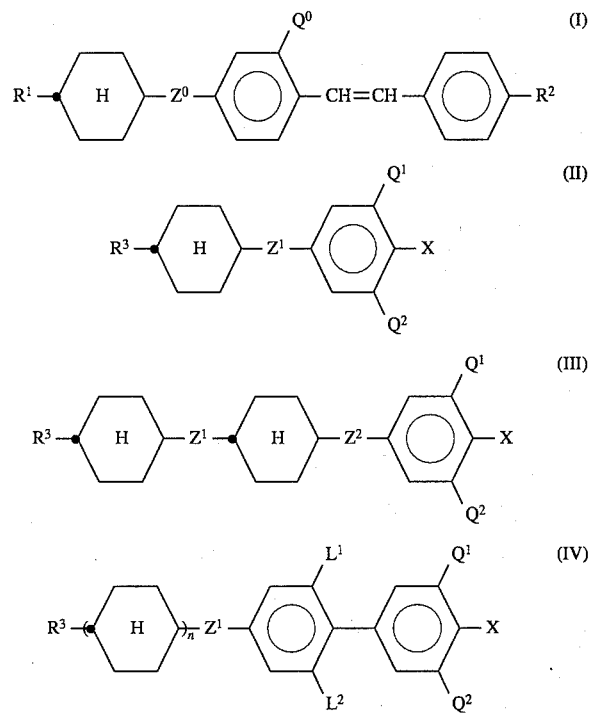

wherein $R^1$ and $R^2$ each represent independently an alkyl group of 1 to 10 carbon atoms in which one or two non-adjacent methylene group(s) may be substituted by an oxygen atom; $R^3$ represents an alkyl group of 1 to 10 carbon atoms; $Z^0$, $Z^1$ and $Z^2$ each represent independently $—CH_2CH_2$13 or a single bond; and $Q^0$ represents H or F; $Q^1$ and $Q^2$ each represent independently H, F or Cl; $L^1$ and $L^2$ each represent independently H or F; X represents F, Cl, $CF_3$, $OCF_3$, $CHF_2$, $OCHF_2$, $OCF_2Cl$ or $OCF_2CHFCF_3$; and n represents an integer of 1 or 2.

17 Claims, No Drawings

5,534,189

LIQUID CRYSTAL COMPOSITION

TECHNICAL FIELD

The present invention relates to a nematic liquid crystal composition and to a liquid crystal display device which contains the same composition in a sealed cell comprising a pair of substrates having a transparent electrode.

BACKGROUND ART

A recent problem for a liquid crystal display device (hereinafter often abbreviated to LCD) requires ① that a display should have a quick electro-optical response in order to display a moving image and ② that a display material should have a wide nematic range (a high clearing point) in order that it can be used in outdoors. Various attempts have been made in various liquid crys-tal display modes to solve the problem. Among those display modes, an active matrix liquid crystal display (hereinafter often abbreviated to AM-LCD) mode employing a thin film transistor (hereinafter often abbreviated to TFT) has begun to attract much attention as one of the most practical flat display, since it has enabled a fine color display.

This AM-LCD employs as a driving mode a TN display mode in which aligning directions of liquid crystal molecules on a pair of substrates are twisted by 90 degrees each other. As G. Bauer reported in Cryst. Liq., 63, 45 (1981), it is required in this TN display mode to set a product $\Delta n \cdot d$ (μm) of a cell gap (hereinafter often abbreviated to d) and an optical anisotropy value (hereinafter often abbreviated to $\Delta n$) of liquid crystal material placed in the cell to a certain definite value, e.g. $\Delta n \cdot d = 0.5$ or $\Delta n \cdot d = 1.0$, in order to prevent an occurrence of an interference fringe on the cell surface. In this situation, it may be possible to reduce the value of d when a liquid crystal material having a large $\Delta n$ value is used. When the d value becomes small, an electro-optical response time (hereinafter often abbreviated to τ) is extremely reduced because τ is proportional to viscosity (hereinafter often abbreviated to η) of the liquid crystal material and also to a square of the cell gap d. Thus, a liquid crystal mixture having both a suitably large $\Delta n$ value and a low viscosity is very useful as a liquid crystal material for such a display device as the aforementioned AM-LCD.

Further, in order to expand a nematic range of a LC mixture, it is necessary to introduce to the LC mixture a liquid crystal compound having a high NI point and a good compatibility with other liquid crystal materials. It is familiar that a compound having a high clearing point and a large number of six-membered rings in its chemical structure is generally mixed with other LC materials for obtaining high thermal stability of the resulting mixture. But, in this case viscosity of the resulting LC mixture increases simultaneously: hence there is a limit for the introduction of the thermally stable liquid crystal compound for the purpose of increasing the thermal stability of the resulting mixture.

Still further, in order to obtain a high contrast display particularly in an AM-LCD there is a demand for a so-called highly reliable liquid crystal composition which has a high specific resistance or a high voltage holding ratio (hereinafter often abbreviated to V.H.R.).

Unexamined Japanese patent publication No. 289682/1990 discloses that a liquid crystal composition containing a benzonitrile compound having a terminal CN group is inadequate to be used as an AM-LCD material because of the low specific registance, and that a LC composition containing a difluorophenyl compound having a terminal F atom is suitable for an AM-LCD material with its large specific registance. However, a LC composition disclosed in the same publication has a defect that it cannot satisfy a quick electro-optical response of the aforementioned problem because of its small $\Delta n$ value.

Although various attempts have been made to liquid crystal materials in different ways of their applications, it is the present status that a novel improvement should continually be sought to the LC materials.

DISCLOSURE OF THE INVENTION

An object of the present invention is to provide a liquid crystal composition which has a wide nematic range (a high clearing point) and a suitably large $\Delta n$ value for attaining a quick response, together with various characteristics required to the AM-LCD materials mentioned above. The present invention in a first aspect resides in, a liquid crystal composition comprising:

a first component consisting of at least one compound expressed by general formula (I):

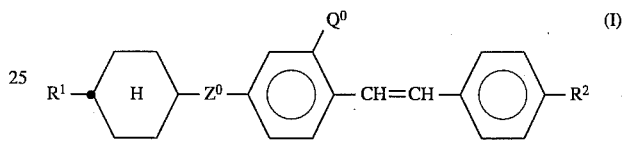

wherein $R^1$ and $R^2$ each represent independently an alkyl group of 1 to 10 carbon atoms in which one or two non-adjacent methylene group(s) may be substituted by an oxygen atom; $Z^0$ represents —$CH_2CH_2$— or a single bond; and $Q^0$ represents H or F, and a second component consisting of at least one compound selected from the group consisting of compounds expressed by formula (II), (III) or (IV):

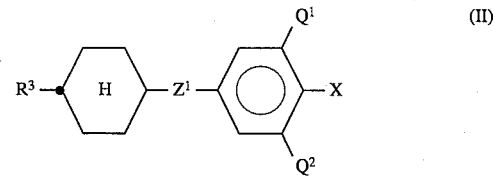

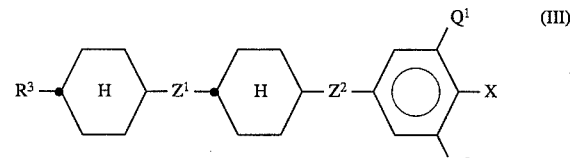

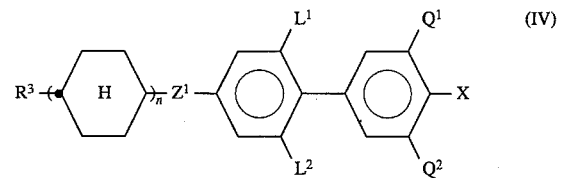

wherein $R^3$ represents an alkyl group of 1 to 10 carbon atoms; X represents F, Cl, $CF_3$, $OCF_3$, $CHF_2$, $OCHF_2$, $OCF_2Cl$ or $OCF_2CHFCF_3$; $Q^1$ and $Q^2$ each represent independently H, F or Cl; $L^1$ and $L^2$ each represent independently H or F; n represents an integer of 1 or 2; and $Z^1$ and $Z^2$ each represent independently —$CH_2CH_2$— or a single bond.

As an embodiment of the present invention, mentioned is a liquid crystal composition further comprising a third component consisting of at least one compound selected from the group consisting of compounds expressed by formula (V) or (VI):

$$R^4-A-Z^3-B-R^5 \quad (V)$$

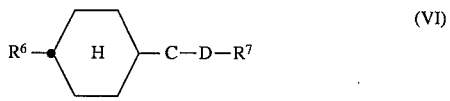

wherein, in formula (V) $R^4$ and $R^5$ each represent independently an alkyl group of 1 to 10 carbon atoms in which one or two non-adjacent methylene group(s) may be substituted by an oxygen atom; A and B each represent independently trans-1,4-cyclohexylene or 1,4-phenylene; and $Z^3$ represents —$CH_2CH_2$— or a single bond, and in formula (VI) $R^6$ represents an alkyl group of 1 to 10 carbon atoms; $R^7$ represents an alkyl group or an alkoxy group each of 1 to 10 carbon atoms; C and D each represent independently trans-1,4-cyclohexylene or 1,4-phenylene.

As another embodiment of the present invention, mentioned is a liquid crystal composition as mentioned above wherein mixing proportions of the first and second components are, by weight, 3–40% and 50–97% of the total weight of the composition, respectively.

As another embodiment of the present invention, mentioned is a liquid crystal composition as mentioned above wherein mixing proportions of the first, second and third components are, by weight, 3–40%, 50–97% and up to 40% of the total weight of the composition, respectively.

As a preferable embodiment of the present invention, mentioned is a liquid crystal composition as mentioned in any one of the above embodiments wherein the first component comprises at least one compound selected from the group consisting of compounds expressed by the formula (I) in which $R^1$ and $R^2$ each represent independently an alkyl group of 1 to 10 carbon atoms.

As another preferable embodiment of the present invention, mentioned is a liquid crystal composition as mentioned in any one of the above embodiments wherein the second component comprises at least one compound selected from the group consisting of compounds expressed by the formula (II), (III) or (IV) in which formulas $R^3$ represents an alkyl group of 1 to 10 carbon atoms; X represents F or Cl; and $L^1$ and $L^2$ each represent H.

The present invention in a second aspect resides in, a liquid crystal display device comprising a liquid crystal composition as set forth in any one embodiment of those described above.

BEST MODE FOR CARRYING OUT THE INVENTION

Compounds composing each component of the present invention will be explained hereinafter.

In the present invention, following compounds are preferably used as a compound expressed by formula (I).

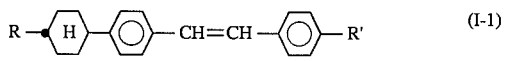

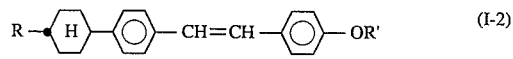

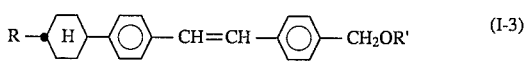

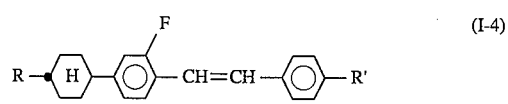

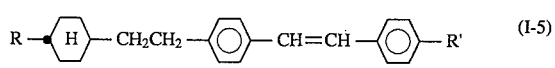

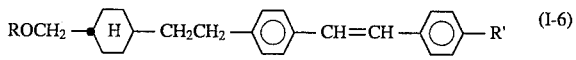

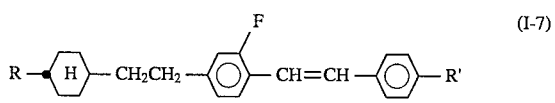

In the above formulas, R and R' each represent independently an alkyl group.

Among these compounds, compounds expressed by formula (I-1), (I-4) or (I-5) are more preferably used.

These aforementioned compounds fill a chief role of a LC compound having a high optical anisotropy in a LC mixture. These compounds having three six-membered rings have good compatibility with other liquid crystal compounds: hence they also fill a role of expanding a nematic range of a resulting mixture.

As compounds similar to that expressed by formula (I), mentioned are tolan compounds which are disclosed in, for example, unexamined Japanese patent publications Nos. 152427/1985, 152334/1988, and 58927/1993.

Comparing compounds of formula (I) with those tolan compounds, the compound of formula (I) very often results in a LC mixture having a wider nematic range and a larger optical anisotropy value than those tolan compounds do when they are admixed in the same amount in the comparative mixtures.

Further, in case of preparing a LC composition for an active matrix mode display device (abbreviated to AM-LCD) which demands high reliability such as high voltage holding ratio (abbreviated to V.H.R.), compounds of formula (I) result in a higher V.H.R. than the tolan compounds in the LC composition.

In addition, as disclosed in the aforementioned unexamined patent publications, compounds of formula (I) are produced as intermediate products for the tolan compounds: hence the compounds of formula (I) have an advantage that their production costs is lower than that of the tolan compounds.

As a second component of a liquid crystal composition of the present invention, the following compounds are preferably employed.

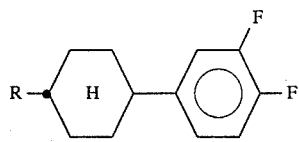 (II-2)
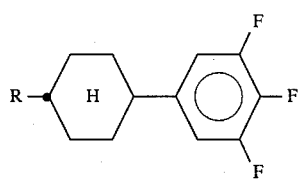 (II-3)
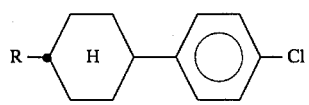 (II-4)
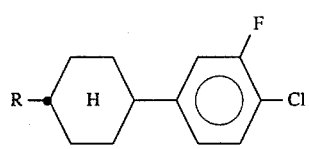 (II-5)
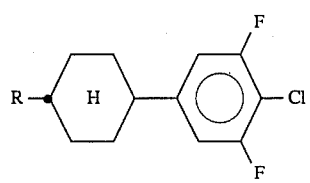 (II-6)
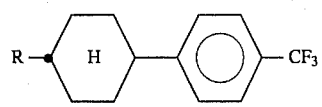 (II-7)
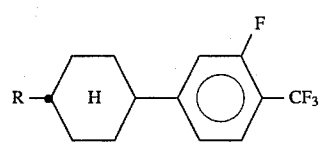 (II-8)
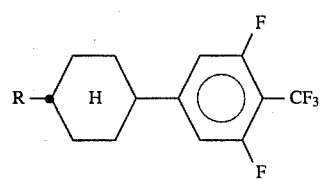 (II-9)
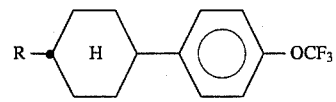 (II-10)
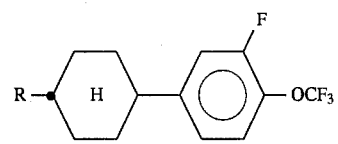 (II-11)
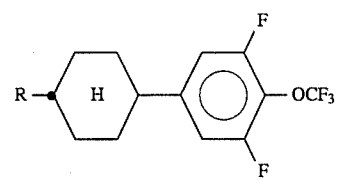 (II-12)

-continued
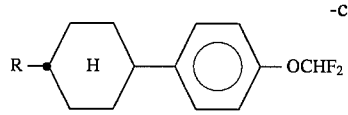 (II-13)
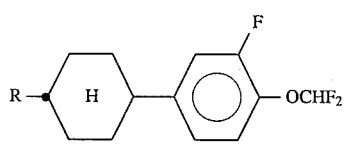 (II-14)
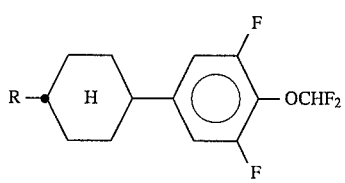 (II-15)
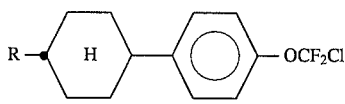 (II-16)
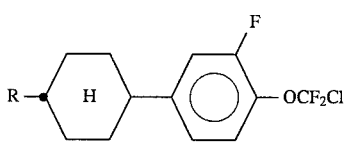 (II-17)
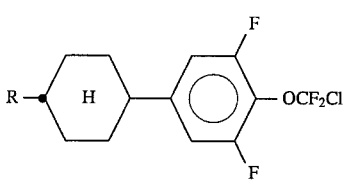 (II-18)
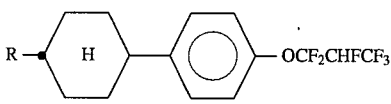 (II-19)
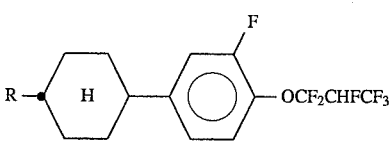 (II-20)
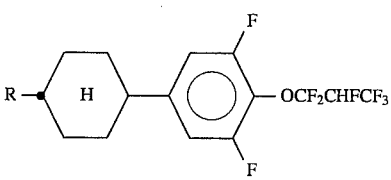 (II-21)
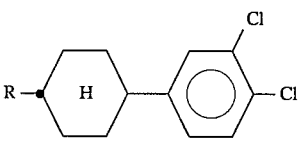 (II-22)
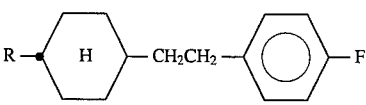 (II-23)

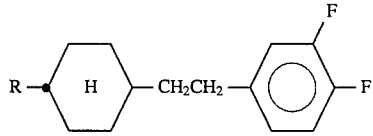 (II-24)
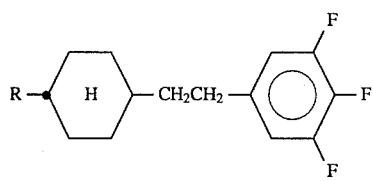 (II-25)
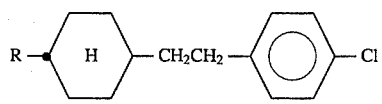 (II-26)
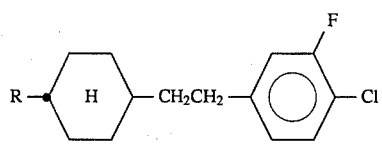 (II-27)
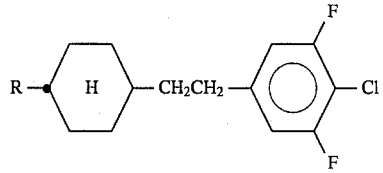 (II-28)
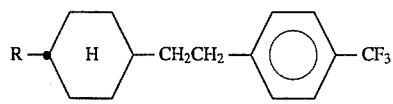 (II-29)
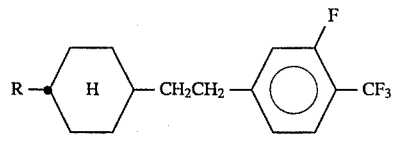 (II-30)
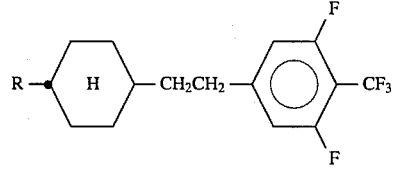 (II-31)
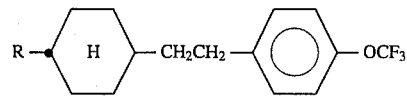 (II-32)
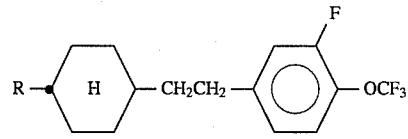 (II-33)
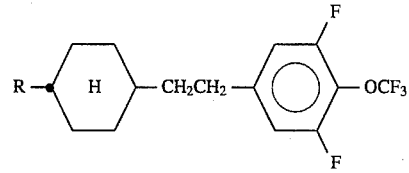 (II-34)

-continued
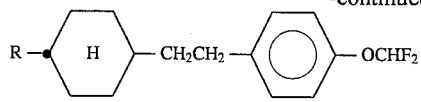 (II-35)
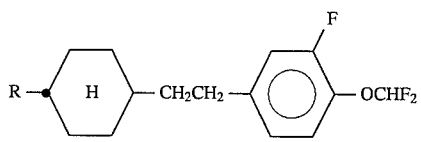 (II-36)
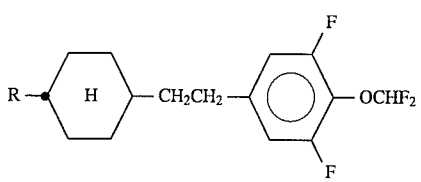 (II-37)
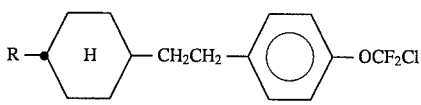 (II-38)
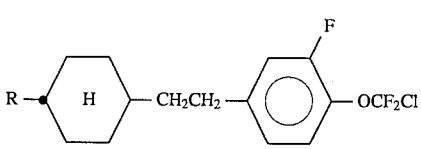 (II-39)
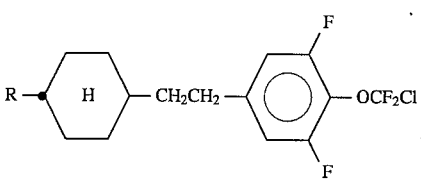 (II-40)
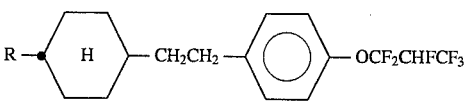 (II-41)
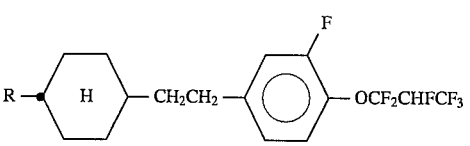 (II-42)
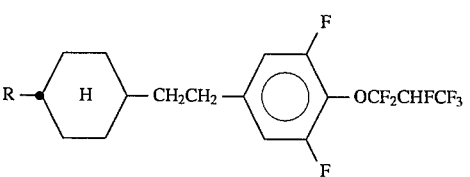 (II-43)
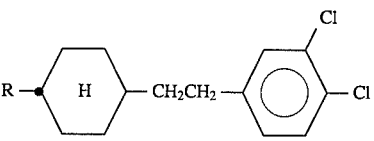 (II-44)
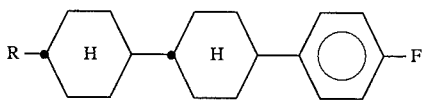 (III-1)

-continued
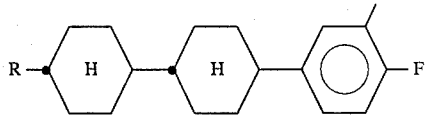
(III-2)
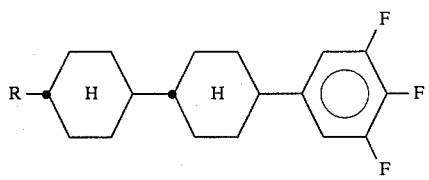
(III-3)
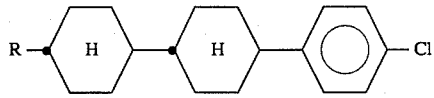
(III-4)
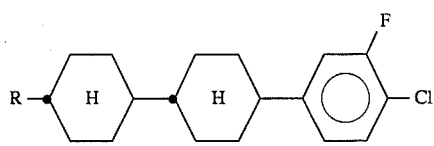
(III-5)
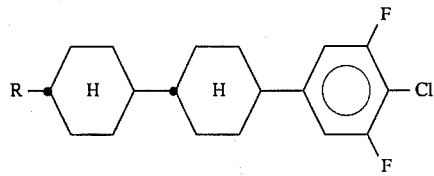
(III-6)
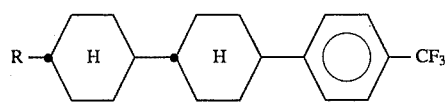
(III-7)
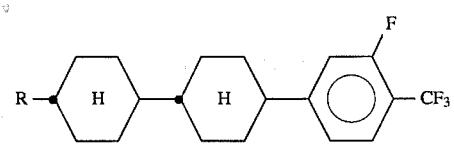
(III-8)
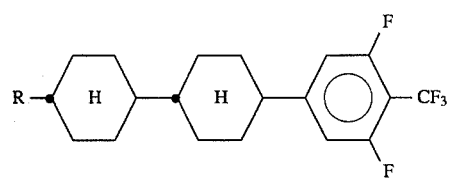
(III-9)
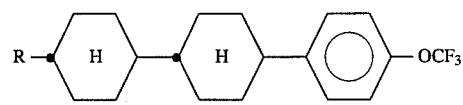
(III-10)
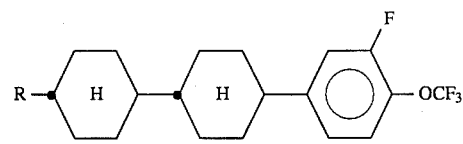
(III-11)
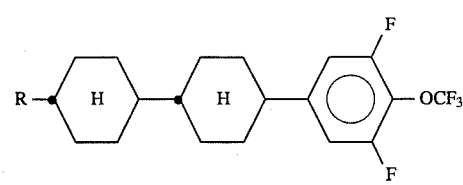
(III-12)

-continued
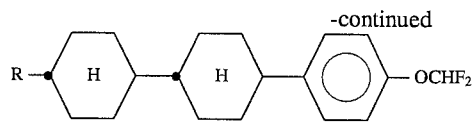  (III-13)
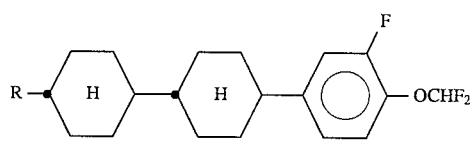  (III-14)
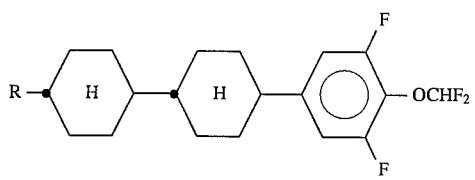  (III-15)
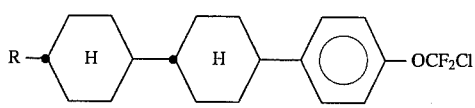  (III-16)
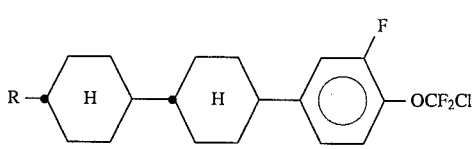  (III-17)
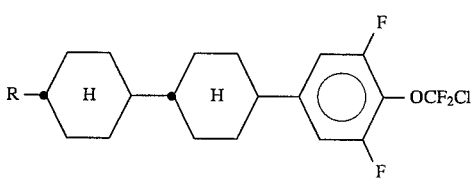  (III-18)
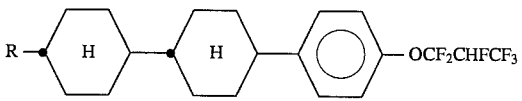  (III-19)
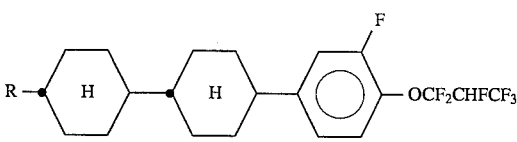  (III-20)
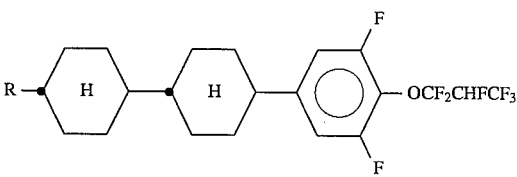  (III-21)
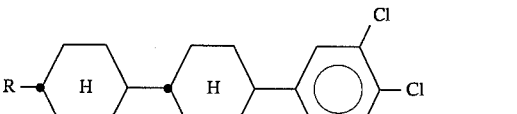  (III-22)
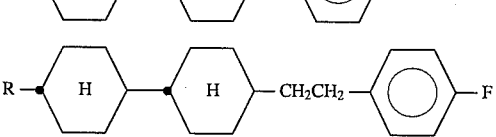  (III-23)

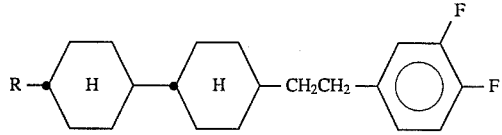 (III-24)
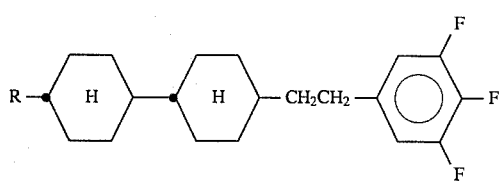 (III-25)
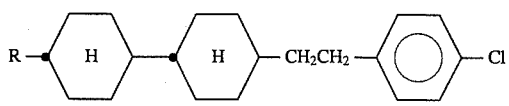 (III-26)
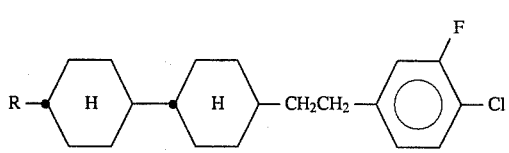 (III-27)
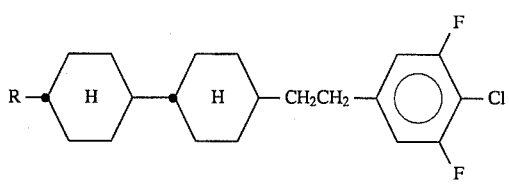 (III-28)
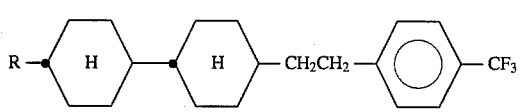 (III-29)
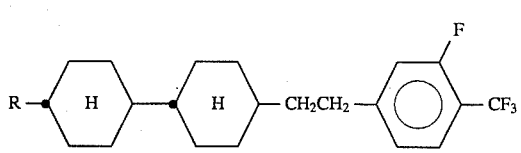 (III-30)
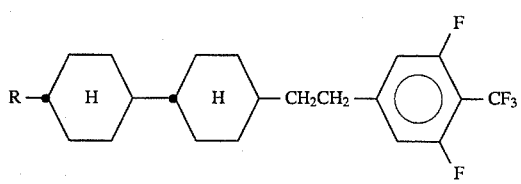 (III-31)
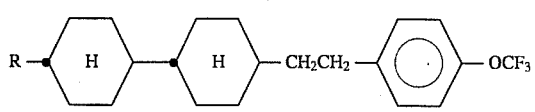 (III-32)
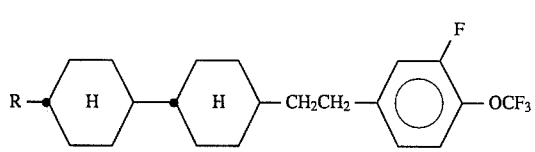 (III-33)
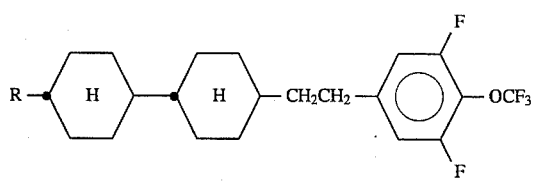 (III-34)

-continued
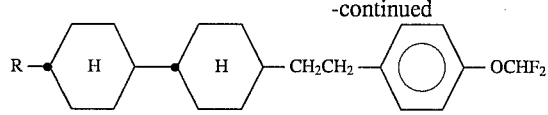 (III-35)
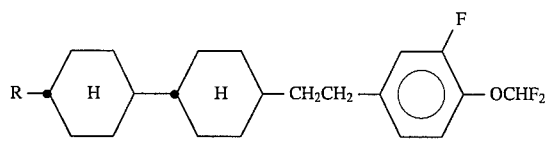 (III-36)
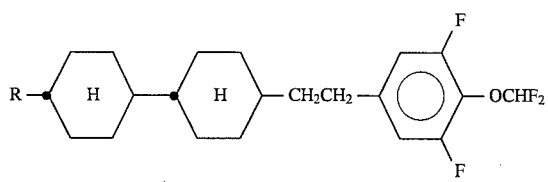 (III-37)
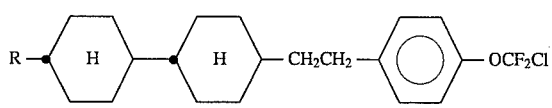 (III-38)
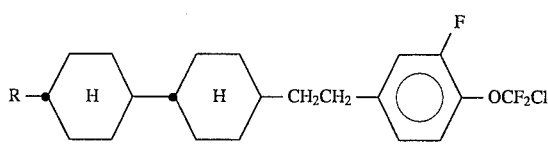 (III-39)
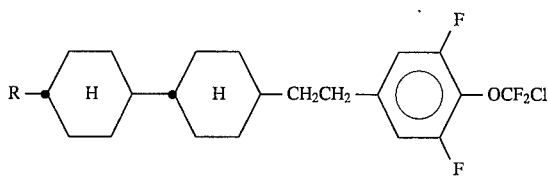 (III-40)
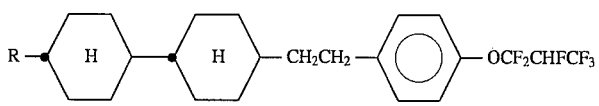 (III-41)
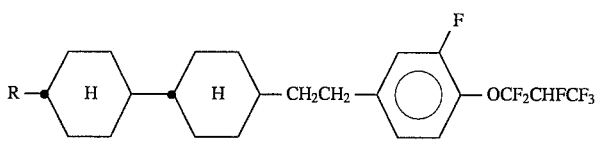 (III-42)
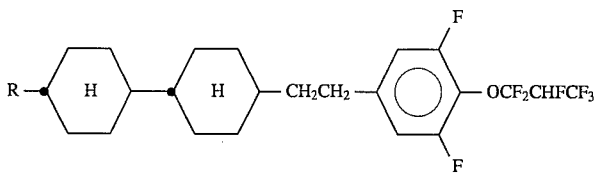 (III-43)
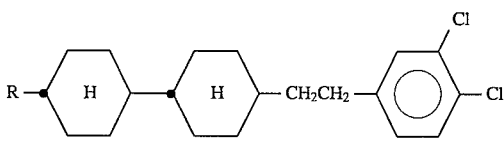 (III-44)
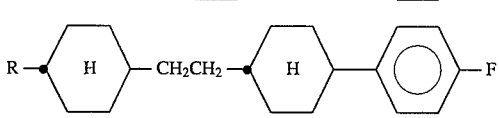 (III-45)

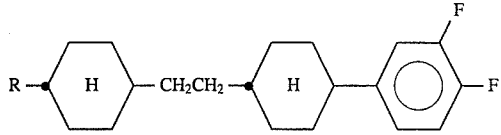 (III-46)
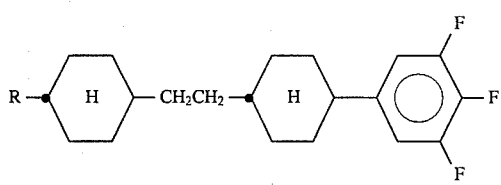 (III-47)
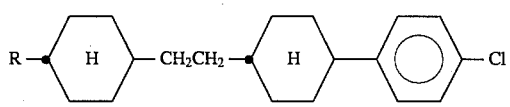 (III-48)
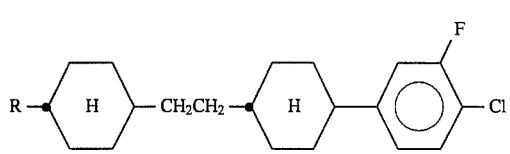 (III-49)
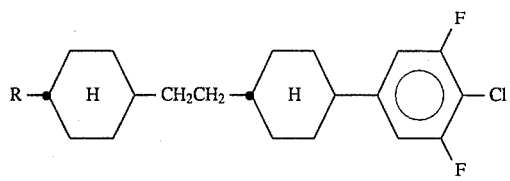 (III-50)
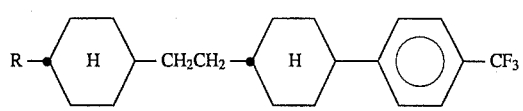 (III-51)
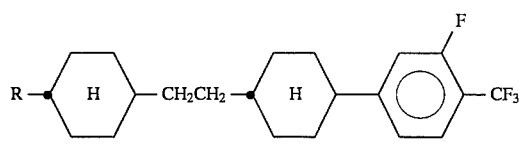 (III-52)
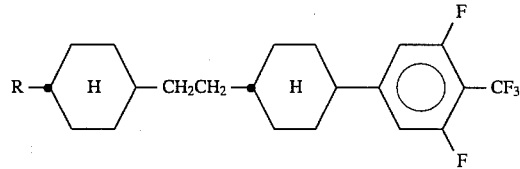 (III-53)
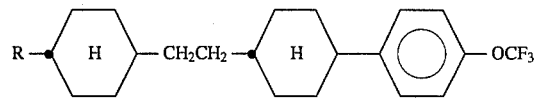 (III-54)
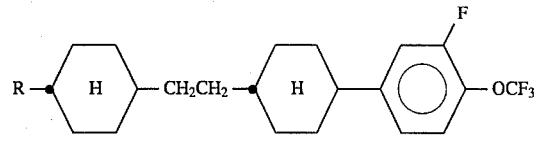 (III-55)
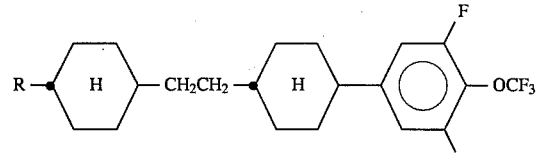 (III-56)

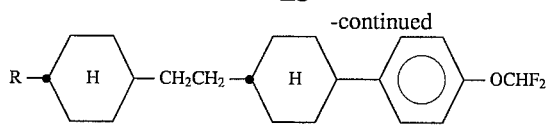 (III-57)
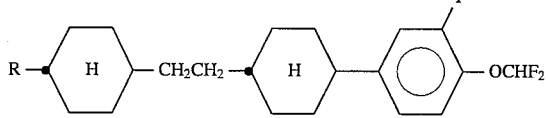 (III-58)
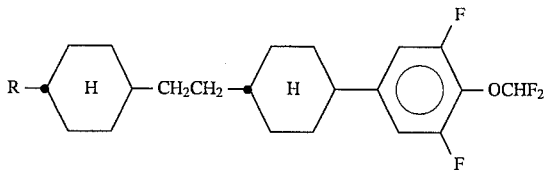 (III-59)
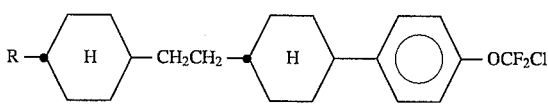 (III-60)
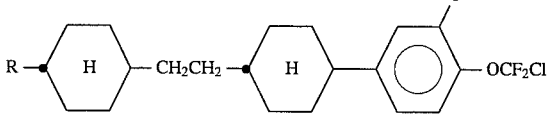 (III-61)
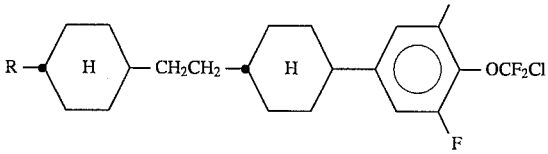 (III-62)
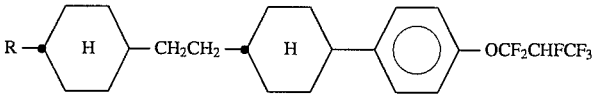 (III-63)
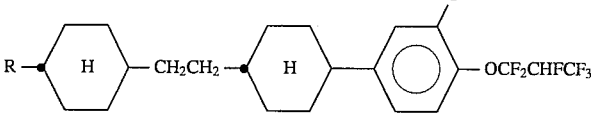 (III-64)
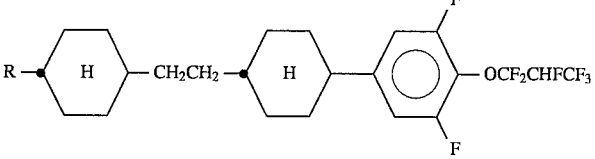 (III-65)
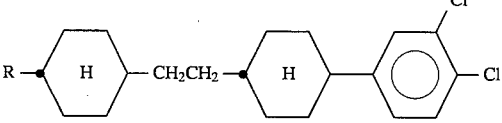 (III-66)
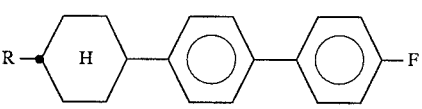 (IV-1)

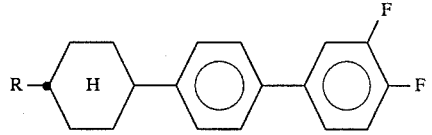
(IV-2)
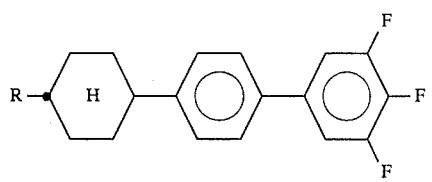
(IV-3)
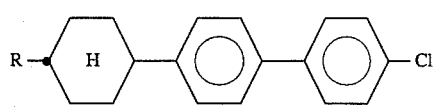
(IV-4)
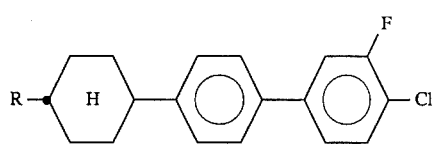
(IV-5)
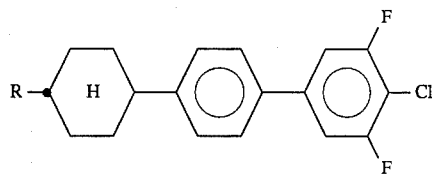
(IV-6)
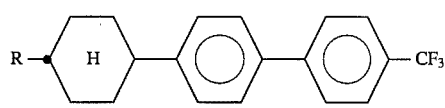
(IV-7)
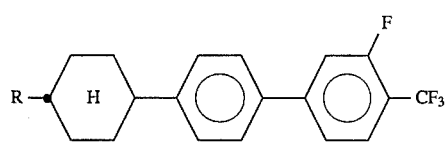
(IV-8)
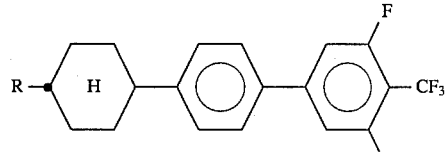
(IV-9)
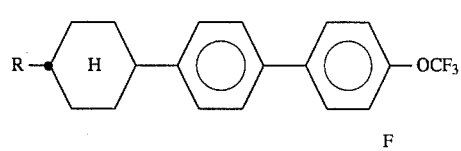
(IV-10)
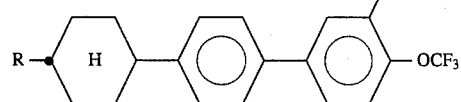
(IV-11)
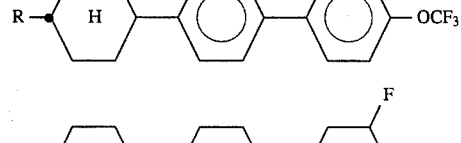
(IV-12)

-continued
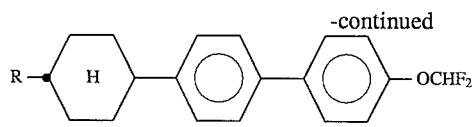 (IV-13)
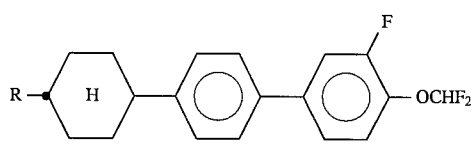 (IV-14)
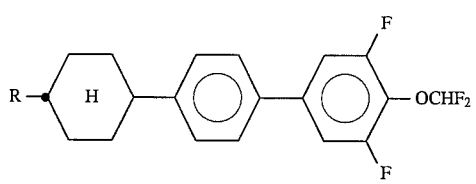 (IV-15)
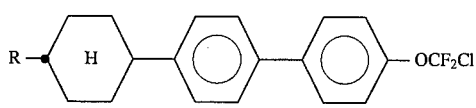 (IV-16)
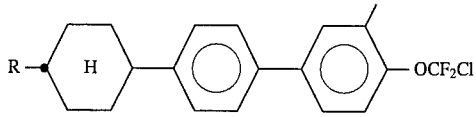 (IV-17)
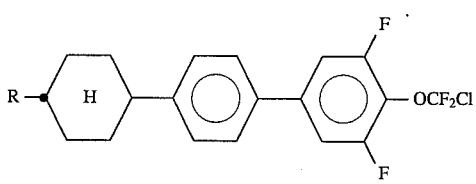 (IV-18)
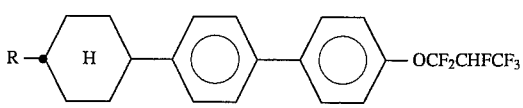 (IV-19)
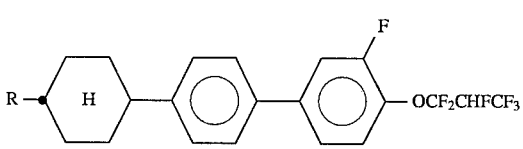 (IV-20)
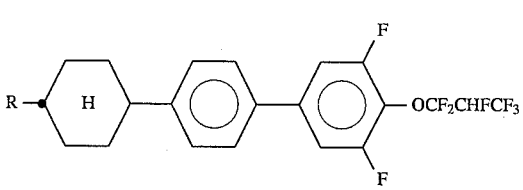 (IV-21)
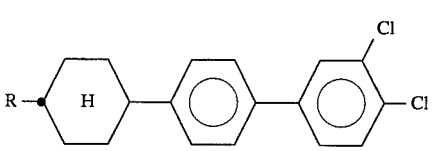 (IV-22)
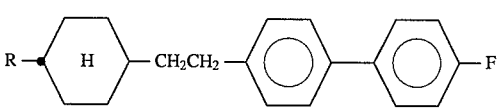 (IV-23)

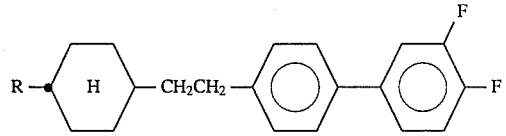 (IV-24)
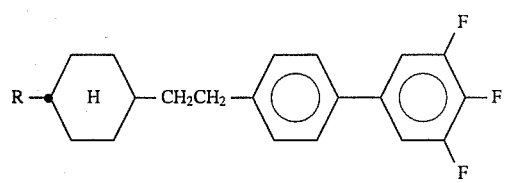 (IV-25)
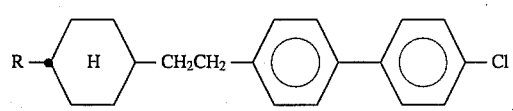 (IV-26)
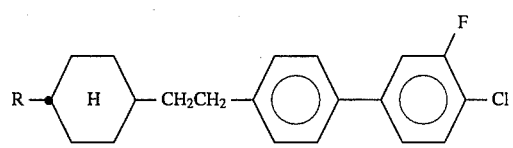 (IV-27)
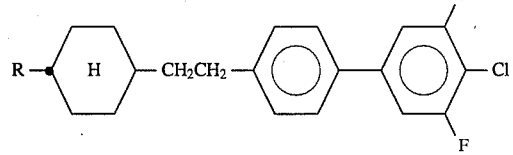 (IV-28)
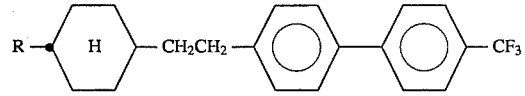 (IV-29)
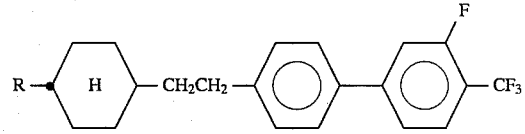 (IV-30)
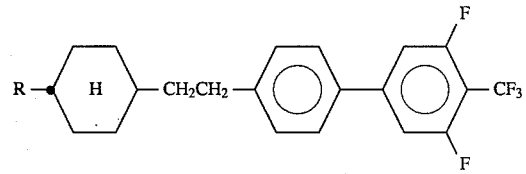 (IV-31)
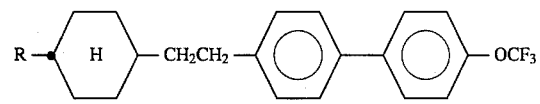 (IV-32)
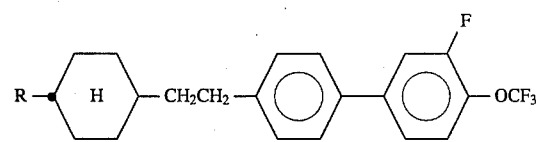 (IV-33)
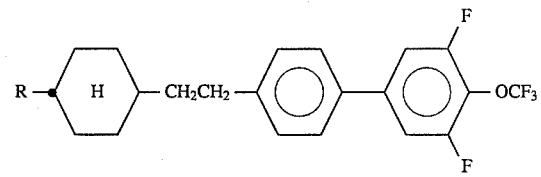 (IV-34)

-continued
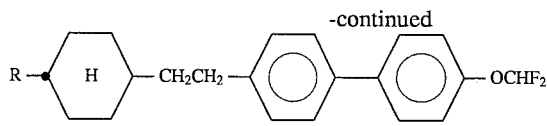 (IV-35)
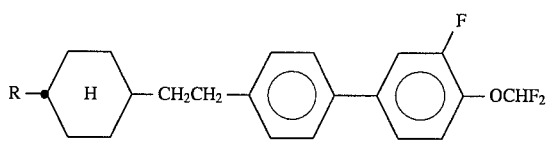 (IV-36)
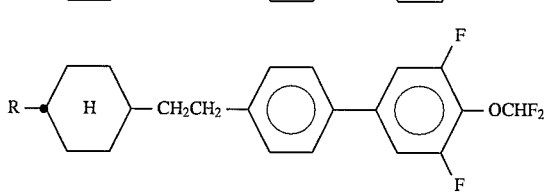 (IV-37)
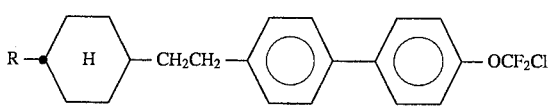 (IV-38)
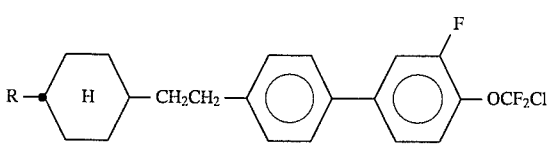 (IV-39)
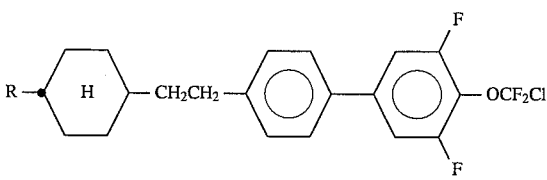 (IV-40)
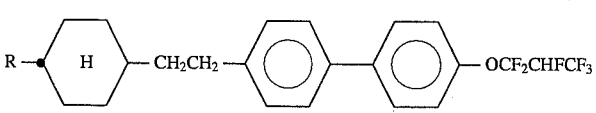 (IV-41)
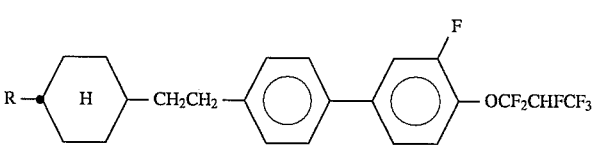 (IV-42)
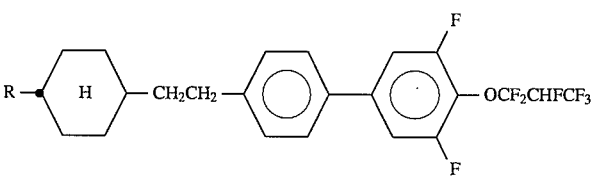 (IV-43)
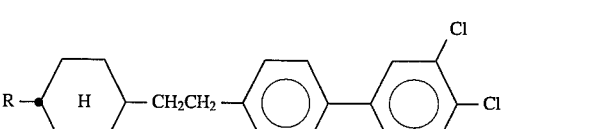 (IV-44)
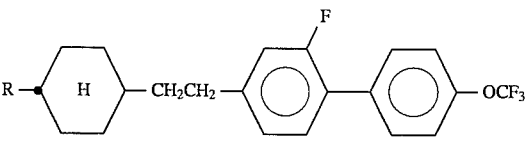 (IV-45)

-continued
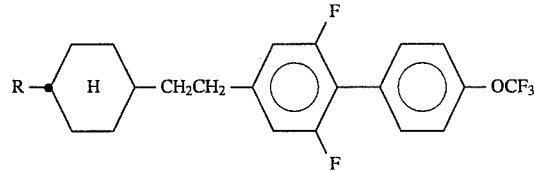 (IV-46)
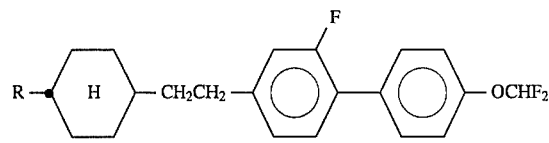 (IV-47)
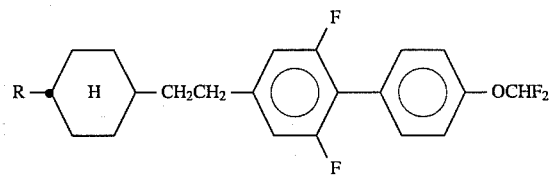 (IV-48)
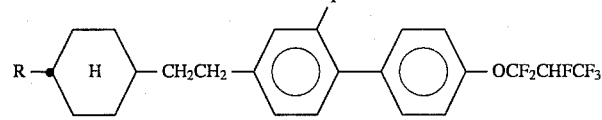 (IV-49)
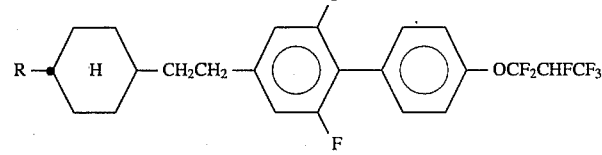 (IV-50)
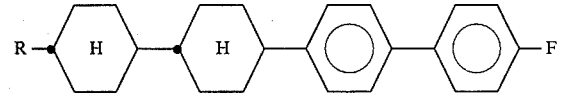 (IV-51)
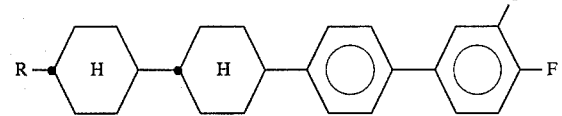 (IV-52)
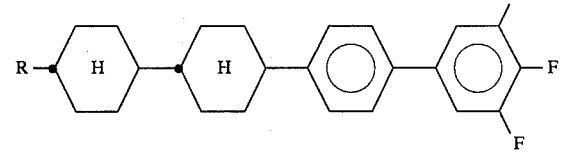 (IV-53)
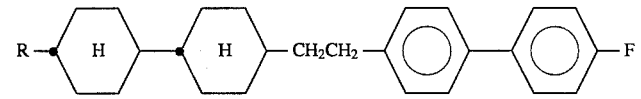 (IV-54)
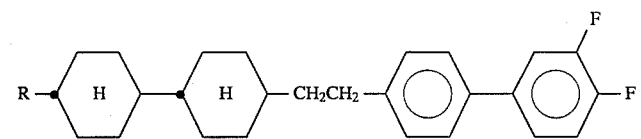 (IV-55)

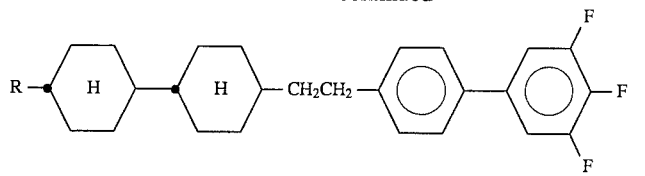
(IV-56)

In these formulas, R represents an alkyl group. Among those compounds described above, compounds of formulas (II-2), (II-3), (II-4), (II-24), (III-1), (III-2), (III-3), (III-4), (III-22), (III-25), (III-46), (III-47), (III-49), (IV-1), (IV-2), (IV-3), (IV-4), (IV-25), (IV-53) and (IV-56) are more preferably used.

Compounds expressed by formula (II), (III) or (IV) have a positive dielectric anisotropy together with high thermal stability and high chemical stability. Those compounds are indispensable for preparing a LC composition for an AM-LCD which requires specific characteristics such as a high voltage holding ratio or high specific electric resistance. Among these compounds, compounds having two rings are used with a chief aim of adjusting a driving voltage and/or viscosity of the resulting mixture. Among the above-described compounds of formulas (II), (III) and (IV), three-ring compounds are used with primary aims of adjusting a nematic range and a clearing point, a driving voltage, a Δn, and/or viscosity of the resulting mixture. Compounds having four rings are used aiming chiefly to adjust a clearing point and a nematic range of the resulting mixture.

The compounds of the second component are already known by a skilled person and are easily available. For example, compounds of formulas (II-2) and (II-4) are shown in respective unexamined Japanese patent publications Nos. 207347/1986 and 2226/1982. Compounds of formulas (II-7) and (III-7) are disclosed in unexamined Japanese patent publication No. 503226/1988, compounds of formulas (II-10) and (IV-10) are disclosed in unexamined Japanese patent publication No. 501311/1990, and compounds of formula (II-13) are disclosed in unexamined Japanese patent publication No. 500413/1991. Further, compounds of formulas (III-1), (III-2), (III-3) and (III-4) are disclosed in respective unexamined Japanese patent publications No. 64626/1982, 154135/1982, 233626/1990 and 114531/1982. Further, compounds of formulas (IV-1) and (IV-2) are disclosed in unexamined Japanese patent publications Nos. 169633/1981 and 185230/1982, respectively.

As a compound of the third component in the present invention, compounds shown in the following are mentioned.

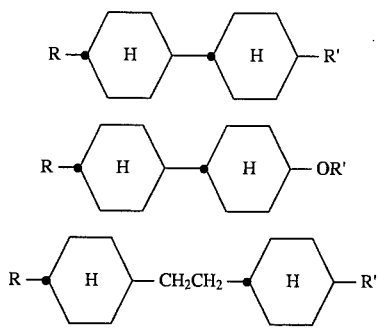

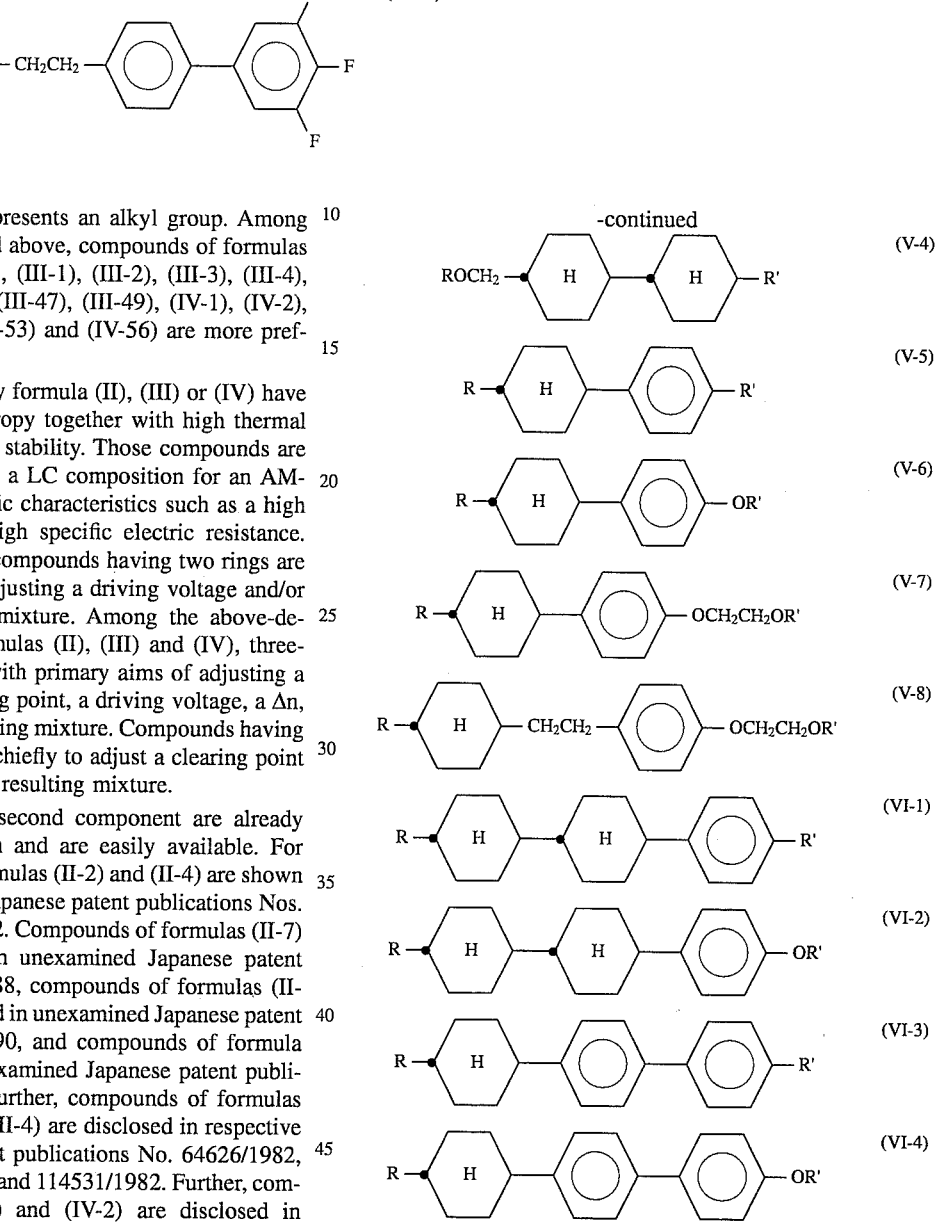

In these formulas R and R' each represent independently an alkyl group. Among the compounds of the above-described formulas, a compound of formulas (V-1), (V-4), (V-6), (VI-1) and (VI-2) are preferably used as a compound of the third component.

A compound expressed by formula (V) is a two-ring compound having a negative or weakly positive dielectric anisotropy. The compound is used in the present invention with a chief aim of reducing viscosity or adjusting a Δn of the resulting composition. A compound expressed by formula (VI) is a three-ring compound having a negative or weakly positive dielectric anisotropy. This compound is used in the present invention with a primary aim of extending a nematic range by increasing a clearing point of the resulting mixture and/or adjusting a Δn thereof.

The third component includes compounds which are also well known. For example, compounds of formulas (V-1), (V-6), (VI-1) and (VI-3) are disclosed in unexamined Japanese patent publications Nos. 70624/1984, 68636/1981, 165328/1982 and 12322/1981, respectively.

In a liquid crystal composition of the present invention, a mixing proportion of the first component is preferably 3 to 40% by weight based on the total weight of the resulting composition. A more preferable mixing proportion of the first component is 5 to 30% by weight. When the mixing proportion of the first component is lower than 3% by weight, it is hardly attained to obtain a LC composition having a high Δn and an elevated clearing point which are primary purpose of admixing the first component. In addition, when the mixing proportion of the first component exceeds 40% by weight, a threshold voltage of the resulting composition often increases.

A mixing proportion of the second component is preferably 40 to 97%, and more preferably 50 to 95%, each by weight, based on the total weight of the composition. When the mixing proportion of the second component is lower than 40% by weight, unfavorable elevation of a threshold voltage may occur. When the content of the second component exceeds 97% by weight, scarcely obtained a chief object of the second component which consists in a high Δn and elevation of a clearing point.

When a third component is used in the present invention, a mixing proportion thereof is up to 40% by weight based on the total weight of the resulting composition. A preferable mixing proportion of the third component is up to 30% by weight. When the mixing proportion of the third component exceeds 40% by weight, a threshold voltage of the resulting composition may increase, which is unfavorable.

A LC composition of the present invention may contain a suitable amount of other compounds than those of the first to third components with aims of adjusting a threshold voltage, a nematic range, a Δn, dielectric anisotropy, viscosity, etc., thereof provided that the object of the present invention is not disturbed. As compounds of this sort the following compounds are exemplified.

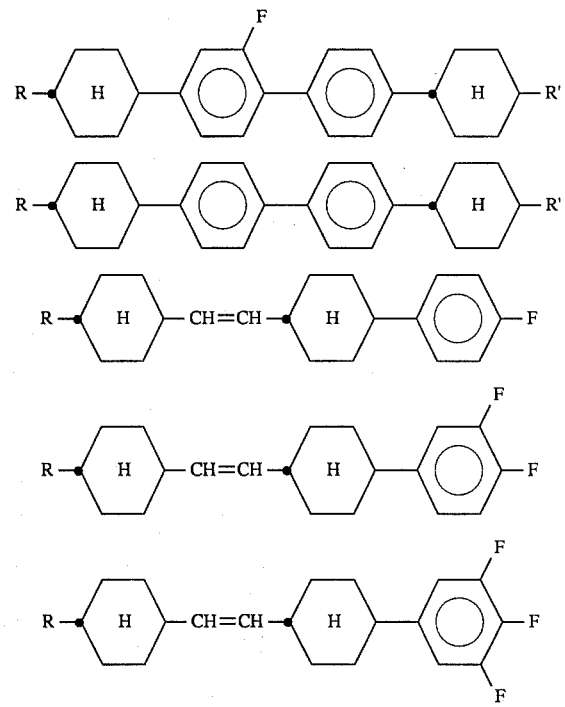

In these formulas R and R' each represent independently an alkyl group.

A liquid crystal composition of the present invention may be prepared by a conventional method, which comprises in general mixing various component compounds, followed by heating the mixture to a temperature higher than their clearing points and melting them to obtain a homogeneous mixture.

A LC composition of the present invention may be improved to be optimized for an intended use by adding a suitable additive compound. Such additive compounds are well known by a skilled person to be disclosed in detail in literatures. Normally, to a present composition is added a chiral dopant which induces a helical structure in LC molecules to prevent a reverse twist thereof.

Further, a present LC composition may be used as a material for a guest and host mode display by admixing dichroic dyestuffs such as merocyanines, styryl derivatives, azo compounds, azomethines, azoxy compounds, quinophthalones, anthraquinones and tetrazine derivatives. A LC composition of the present invention may also be used as a LC material for a polymer dispersed liquid crystal display device (PDLCD) such as a NCAP which is prepared by encapsulating nematic liquid crystal materials, and a polymer network liquid crystal display device (PNLCD) in which a three dimensional network is prepared with polymer in liquid crystals. Further, a LC composition of the present invention may also used as a LC material for a display device which is driven under an electrically controlled birefringence (ECB) mode or a dynamic scattering (DS) mode.

More preferable embodiments of the present invention are mentioned in items (1) to (6) as follows.

(1) A liquid crystal composition comprising:
 a first component consisting of at least one member selected from the group consisting of compounds expressed by aforementioned formula (I-1), (I-4) or (I-5), and
 a second component consisting of at least one member selected from the group consisting of compounds expressed by aforementioned formula (II-2), (II-3), (II-4), (II-24), (III-1), (III-2), (III-3), (III-4), (III-22), (III-25), (III-46), (III-47), (III-49), (IV-1), (IV-2), (IV-3), (IV-4), (IV-25), (IV-53) or (IV-56).

(2) A liquid crystal composition as defined in item (1), in which the first and second components are contained in 5 to 30% by weight and 70 to 95% by weight, respectively, based on the total weight of the composition.

(3) A liquid crystal composition as defined in item (1), further comprising a third component consisting of at least one member selected from the group consisting of compounds expressed by aforementioned formula (V-1), (V-4), (V-6), (VI-1) or (VI-2).

(4) A liquid crystal composition as defined in item (3), in which the first, second and third compositions are contained in 5 to 25% by weight, 50 to 90% by weight and 5 to 25% by weight, respectively, based on the total weight of the composition.

(5) A liquid crystal composition as defined in any one of the above items (1) to (4), in which each component consists at least two compounds.

(6) A liquid crystal display device comprising a liquid crystal composition as defined in any one of the above items (1) to (5).

EXAMPLES

The present invention will be described in detail by way of examples but the present invention should not be construed to be limited thereto. In these examples, composition is expressed in per cent by weight and a voltage holding ratio is determined by area ratio method wherein integrated voltage per cycle time is expressed by the area.

Comparative Example 1

A liquid crystal composition A consisting of the following compounds was prepared.

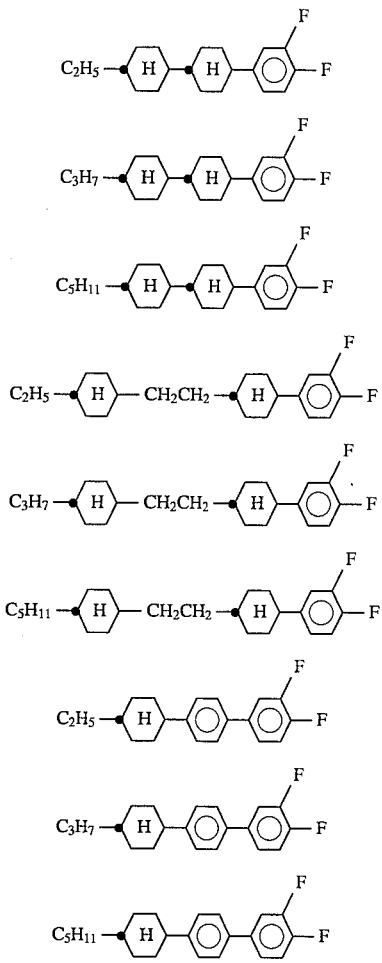

A clearing point $T_{NI}$, viscosity ($\eta_{20}$) at 20° C., an optical anisotropy ($\Delta n$) at 25° C., a dielectric anisotropy ($\Delta \epsilon$) at 20° C., and a threshold voltage ($V_{th}$) of this liquid crystal composition were 100.2° C., 25.3 mPa.s, 0.093, 5.1 and 2.20 V, respectively.

Comparative Example 2

There was prepared a liquid crystal composition consisting of 85 parts by weight of liquid crystal composition A prepared in comparative example 1 and 15 parts by weight of a liquid crystal mixture consisting of the following three compounds each in an equal amount.

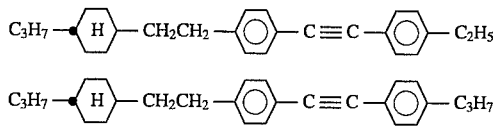

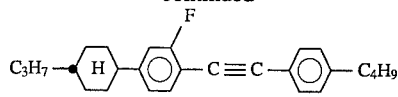

A clearing point $T_{NI}$, viscosity ($\eta_{20}$) at 20° C., an optical anisotropy ($\Delta n$) at 25° C., a dielectric anisotropy ($\Delta \epsilon$) at 20° C., and a threshold voltage ($V_{th}$) of this liquid crystal composition were 113.7° C., 24.5 mPa.s, 0.114, 4.6 and 2.52 V, respectively. This liquid crystal composition was placed in a liquid crystal cell having a cell gap of 6 μm to determine a voltage holding ratio. Voltage holding ratio values were 96.8% at 25° C., and 94.7% at 60° C.

Example 1

A liquid crystal composition consisting of 85 parts by weight of the liquid crystal composition A prepared in Comparative example 1 and 15 parts by weight of a liquid crystal mixture consisting of the following three compounds each in equal amount was prepared.

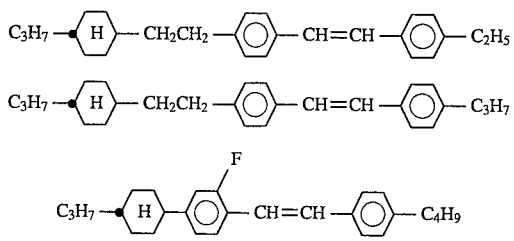

A clearing point $T_{NI}$, viscosity ($\eta_{20}$) at 20° C., an optical anisotropy ($\Delta n$) at 25° C., a dielectric anisotropy ($\Delta \epsilon$) at 20° C., and a threshold voltage ($V_{th}$) of this liquid crystal composition were 119.5° C., 26.9 mPa.s, 0.119, 4.6 and 2.54 V, respectively. This liquid crystal composition was placed in a liquid crystal cell having a cell gap of 6 μm to determine a voltage holding ratio to result a V.H.R. of 98.9% at 25° C., and a V.H.R. of 97.8% at 60 ° C.

Comparing the results with those of Comparating example 1, the $\Delta n$ value is larger and a clearing point is higher in Example 1 than those of comparative example 1. The result of Example 1 shows a greater V.H.R. value than that of Comparative example 2 by about 2 to 3%, of which greater V.H.R. value consists high reliability of a LCD which is desired for an AM-LCD material.

Example 2

A liquid crystal composition consisting of the following compounds was prepared.

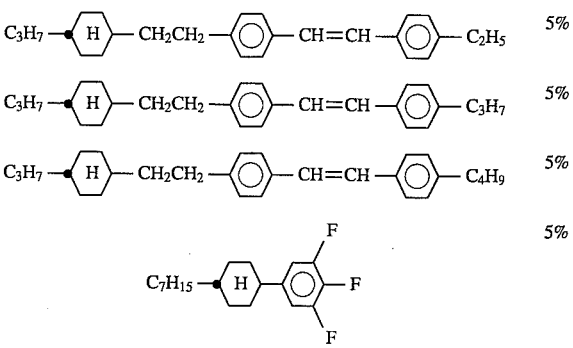

-continued
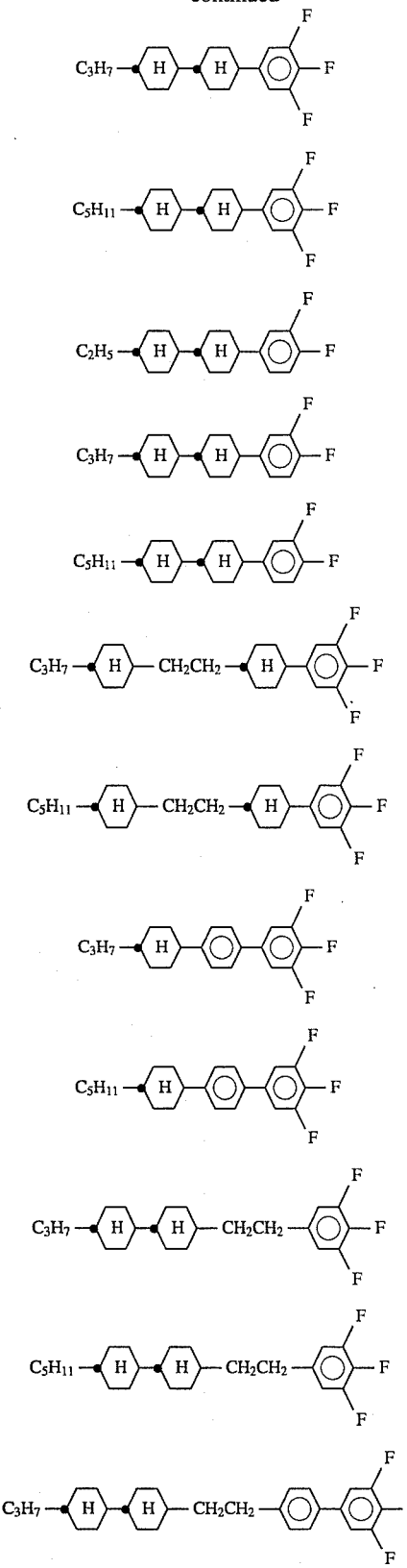
A clearing point, viscosity at 20° C., an optical anisotropy at 25° C., a dielectric anisotropy at 20° C., and a threshold voltage of this liquid crystal composition were 107.4° C., 25.4 mPa.s, 0.114, 6.6 and 2.15 V, respectively. A V.H.R. at 20° C. was 98.5%.
Example 3
A liquid crystal composition consisting of the following compounds was prepared.
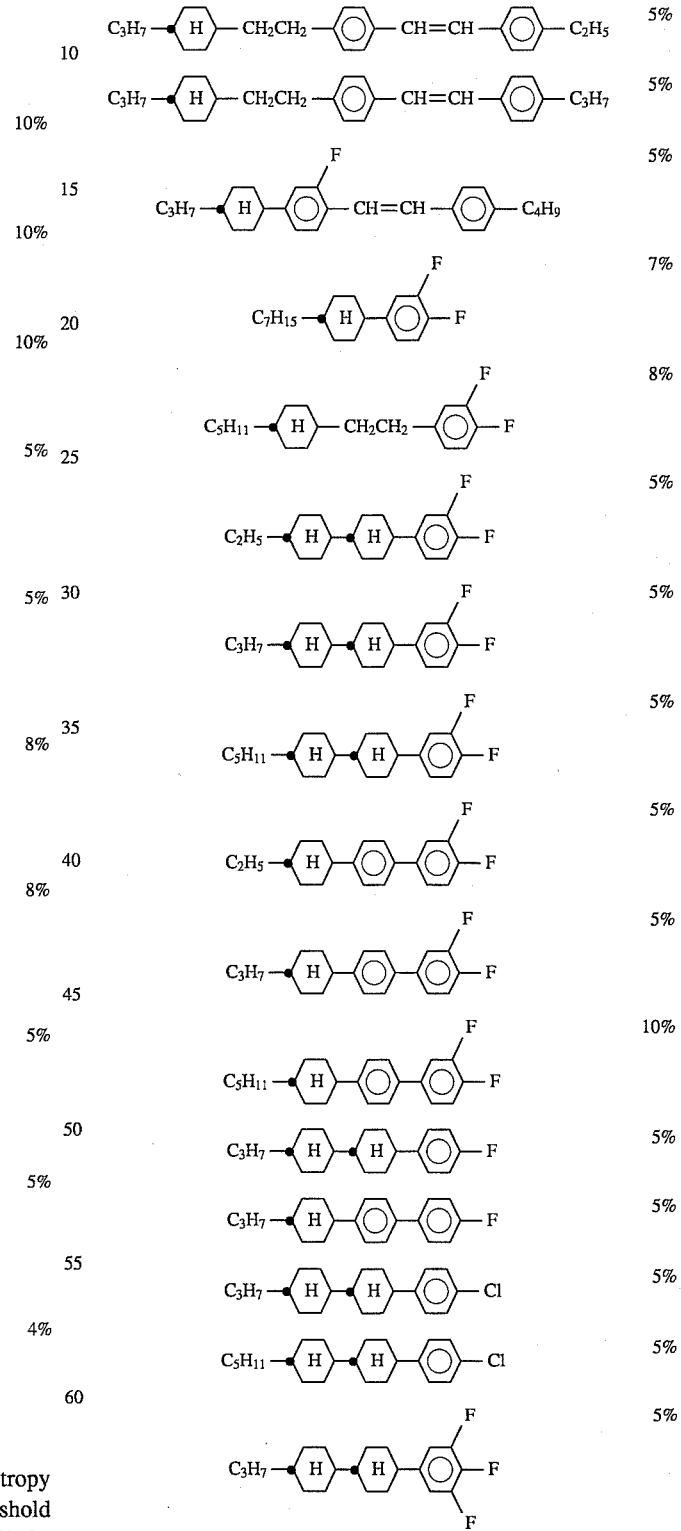

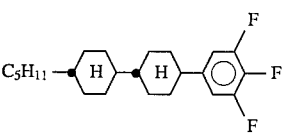 5%

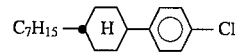 5%

A clearing point, viscosity at 20° C., an optical anisotropy at 25° C., a dielectric anisotropy at 20° C., and a threshold voltage of this liquid crystal composition were 100.6° C., 19.9 mPa.s, 0.122, 4.4 and 2.53 V, respectively. A V.H.R. at 20° C. was 98.8%.

Example 4

A liquid crystal composition consisting of the following compounds was prepared.

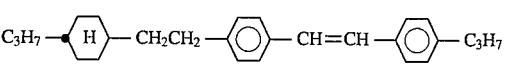 7%

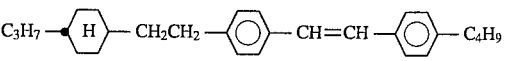 8%

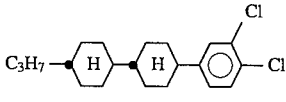 5%

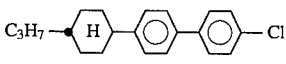 5%

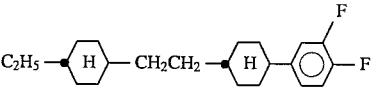 10%

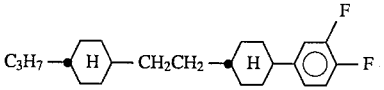 5%

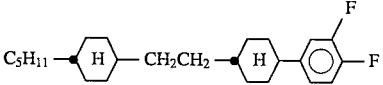 10%

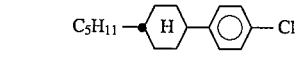 5%

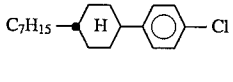 5%

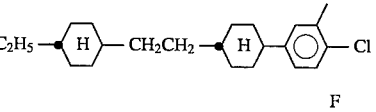 5%

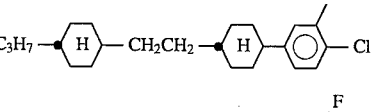 5%

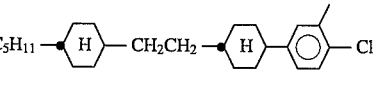 5%

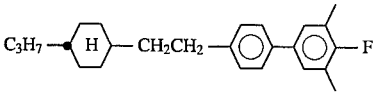 5%

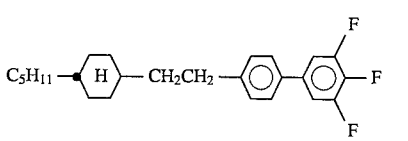 5%

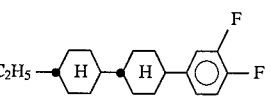 5%

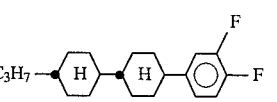 5%

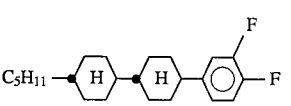 5%

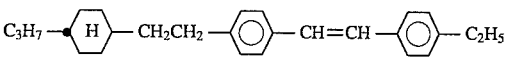 5%

A clearing point, viscosity at 20° C., an optical anisotropy at 25° C., a dielectric anisotropy at 20° C., and a threshold voltage of this liquid crystal composition were 108.9° C., 27.4 mPa.s, 0.118, 4.3 and 2.66 V, respectively. A V.H.R. at 20° C. was 99.0%.

Example 5

A liquid crystal composition consisting of the following compounds was prepared.

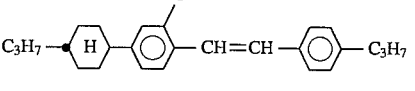 5%

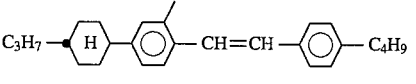 5%

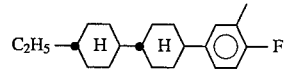 5%

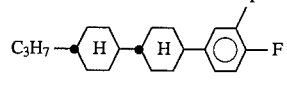 5%

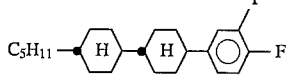 5%

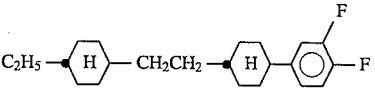 5%

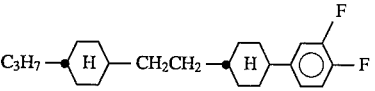 10%

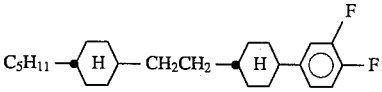 5%

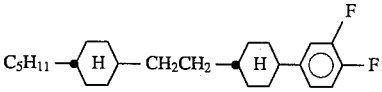 10%

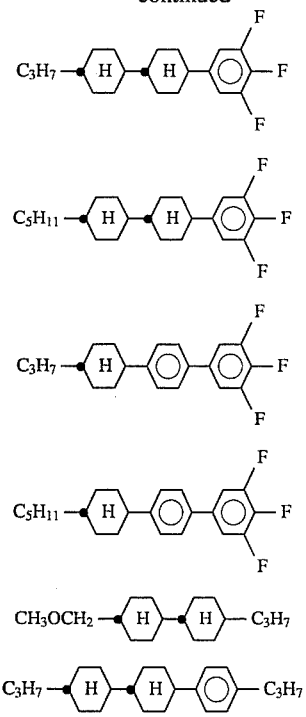

7%

8%

7%

8%

7%

8%

A clearing point, viscosity at 20° C., an optical anisotropy at 25° C., a dielectric anisotropy at 20° C., and a threshold voltage of this liquid crystal composition were 123.0° C., 26.0 mPa.s, 0.110, 4.8 and 2.60 V, respectively. A V.H.R. at 20° C. was 98.9%.

Example 6

A liquid crystal composition consisting of the following compounds was prepared.

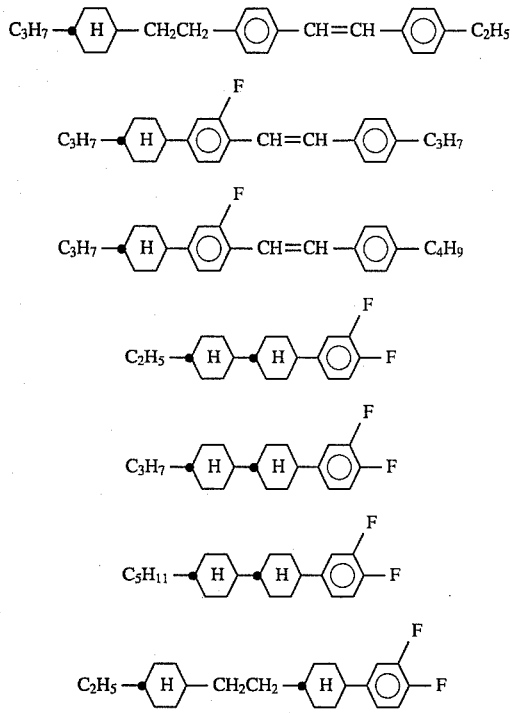

5%

5%

5%

5%

5%

5%

10%

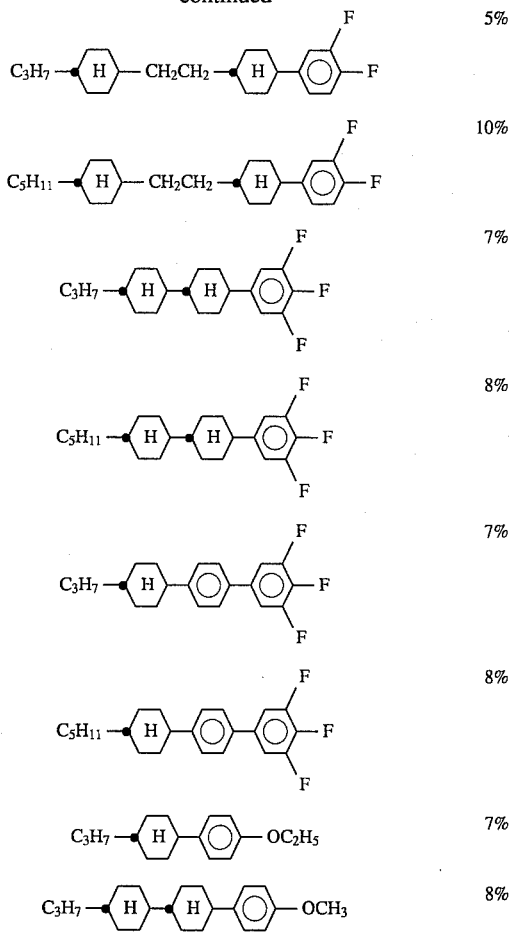

5%

10%

7%

8%

7%

8%

7%

8%

A clearing point, viscosity at 20° C., an optical anisotropy at 25° C., a dielectric anisotropy at 20° C., and a threshold voltage of this liquid crystal composition were 123.5° C., 26.5 mPa.s, 0,113, 4.9 and 2.62 V, respectively. A V.H.R. at 20° C. was 98.9%.

As shown in the aforementioned examples and comparative examples, a liquid crystal composition having a wide nematic range, a particularly high clearing point and a suitably high Δn value is provided by the present invention.

This liquid crystal composition satisfies various characteristics such as a high voltage holding ratio, a quick electro-optical response, etc., which are desired for a liquid crystal material for AM-LCD.

We claim:

1. A liquid crystal composition comprising:

a first component consisting of at least one compound expressed by general formula (I):

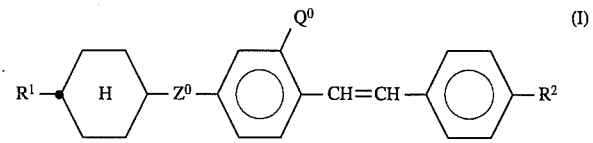

wherein $R^1$ and $R^2$ each represent independently an alkyl group of 1 to 10 carbon atoms in which one or two non-adjacent methylene group(s) may be substituted by an oxygen atom; $Z^0$ represents —$CH_2CH_2$— or a single bond; and $Q^0$ represents H or F, and a second component consisting of at least one compound selected from the group consisting of compounds expressed by formula (II), (III) or (IV):

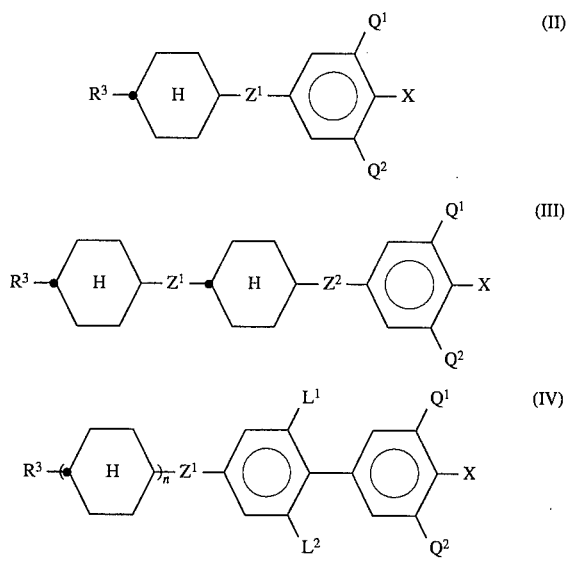

wherein $R^3$ represents an alkyl group of 1 to 10 carbon atoms; X represents F, Cl, $CF_3$, $OCF_3$, $CHF_2$, $OCHF_2$, $OCF_2Cl$ or $OCF_2CHFCF_3$; $Q^1$ and $Q^2$ each represent independently H, F or Cl; $L^1$ and $L^2$ each represent independently H or F; n represents an integer of 1 or 2; and $Z^1$ and $Z^2$ each represent independently —$CH_2CH_2$— or a single bond.

2. A liquid crystal composition according to claim 1 wherein mixing proportions of said first and second components are, by weight, 3–40% and 50–97% of the total weight of said composition, respectively.

3. A liquid crystal composition according to claim 2, further comprising a third component consisting at least one compound selected from the group consisting of compounds expressed by formula (V) or (VI):

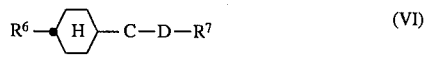

wherein, in formula (V) $R^4$ and $R^5$ each represent independently an alkyl group of 1 to 10 carbon atoms in which one or two non-adjacent methylene group(s) may be substituted by an oxygen atom; A and B each represent independently trans-1,4-cyclohexylene or 1,4-phenylene; and $Z^3$ represents —$CH_2CH_2$— or a single bond, and in formula (VI) $R^6$ represents an alkyl group of 1 to 10 carbon atoms; $R^7$ represents an alkyl group or an alkoxy group each of 1 to 10 carbon atoms; C and D each represent independently trans-1,4-cyclohexylene or 1,4-phenylene.

4. A liquid crystal composition according to claim 3 wherein mixing proportions of said first, second and third components are, by weight, 3–40%, 50–97% and up to 40% of the total weight of said composition, respectively.

5. A liquid crystal composition according to claim 1, wherein said first component comprises at least one compound selected from the group consisting of compounds expressed by the formula (I) in which $R^1$ and $R^2$ each represent independently an alkyl group of 1 to 10 carbon atoms.

6. A liquid crystal composition according to claim 2, wherein said first component comprises at least one compound selected from the group consisting of compounds expressed by the formula (I) in which $R^1$ and $R^2$ each represent independently an alkyl group of 1 to 10 carbon atoms.

7. A liquid crystal composition according to claim 3, wherein said first component comprises at least one compound selected from the group consisting of compounds expressed by the formula (I) in which $R^1$ and $R^2$ each represent independently an alkyl group of 1 to 10 carbon atoms.

8. A liquid crystal composition according to claim 4, wherein said first component comprises at least one compound selected from the group consisting of compounds expressed by the formula (I) in which $R^1$ and $R^2$ each represent independently an alkyl group of 1 to 10 carbon atoms.

9. A liquid crystal composition according to claim 1, wherein said second component comprises at least one compound selected from the group consisting of compounds expressed by the formula (II), (III) or (IV) in which formulas $R^3$ represents an alkyl group of 1 to 10 carbon atoms; X represents F or Cl; and $L^1$ and $L^2$ each represent H.

10. A liquid crystal composition according to claim 2, wherein said second component comprises at least one compound selected from the group consisting of compounds expressed by the formula (II), (III) or (IV) in which formulas $R^3$ represents an alkyl group of 1 to 10 carbon atoms; X represents F or Cl; and $L^1$ and $L^2$ each represent H.

11. A liquid crystal composition according to claim 3, wherein said second component comprises at least one compound selected from the group consisting of compounds expressed by the formula (II), (III) or (IV) in which formulas $R^3$ represents an alkyl group of 1 to 10 carbon atoms; X represents F or Cl; and $L^1$ and $L^2$ each represent H.

12. A liquid crystal composition according to claim 4, wherein said second component comprises at least one compound selected from the group consisting of compounds expressed by the formula (II), (III) or (IV) in which formulas $R^3$ represents an alkyl group of 1 to 10 carbon atoms; X represents F or Cl; and $L^1$ and $L^2$ each represent H.

13. A liquid crystal composition according to claim 5, wherein said second component comprises at least one compound selected from the group consisting of compounds expressed by the formula (II), (III) or (IV) in which formulas $R^3$ represents an alkyl group of 1 to 10 carbon atoms; X represents F or Cl; and $L^1$ and $L^2$ each represent H.

14. A liquid crystal composition according to claim 6, wherein said second component comprises at least one compound selected from the group consisting of compounds expressed by the formula (II), (III) or (IV) in which formulas $R^3$ represents an alkyl group of 1 to 10 carbon atoms; X represents F or Cl; and $L^1$ and $L^2$ each represent H.

15. A liquid crystal composition according to claim 7, wherein said second component comprises at least one compound selected from the group consisting of compounds expressed by the formula (II), (III) or (IV) in which formulas $R^3$ represents an alkyl group of 1 to 10 carbon atoms; X represents F or Cl; and $L^1$ and $L^2$ each represent H.

16. A liquid crystal composition according to claim 8, wherein said second component comprises at least one compound selected from the group consisting of compounds expressed by the formula (II), (III) or (IV) in which formulas $R^3$ represents an alkyl group of 1 to 10 carbon atoms; X represents F or Cl; and $L^1$ and $L^2$ each represent H.

17. A liquid crystal display device comprising a liquid crystal composition as set forth in any one of claims 1 to 16.

* * * * *